(12) United States Patent
Fan

(10) Patent No.: US 12,178,316 B2
(45) Date of Patent: Dec. 31, 2024

(54) ELECTRONIC DEVICE STAND

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 18/086,566

(22) Filed: Dec. 21, 2022

(65) Prior Publication Data

US 2024/0081526 A1    Mar. 14, 2024

(30) Foreign Application Priority Data

Sep. 13, 2022 (CN) .................. 2022224188243.3

(51) Int. Cl.
*A47B 23/04*     (2006.01)
*G06F 1/16*      (2006.01)

(52) U.S. Cl.
CPC ............ *A47B 23/04* (2013.01); *G06F 1/1633* (2013.01); *A47B 2023/049* (2013.01)

(58) Field of Classification Search
None
See application file for complete search history.

(56) References Cited

U.S. PATENT DOCUMENTS

| | | | |
|---|---|---|---|
| 6,176,549 B1* | 1/2001 | Karash | A47C 5/005 297/391 |
| 8,424,825 B2* | 4/2013 | Somuah | B60R 11/0252 248/316.4 |
| 8,424,830 B2* | 4/2013 | Yang | A47B 23/044 248/459 |
| 9,303,810 B2* | 4/2016 | Adams | F16M 11/38 |
| 9,689,526 B2* | 6/2017 | Yeh | F16M 11/10 |
| D828,057 S  * | 9/2018 | Yaguchi | D6/681 |
| 10,565,902 B2* | 2/2020 | Bao | G09F 7/18 |
| 11,523,684 B1* | 12/2022 | Huang | A47B 23/043 |
| 11,736,135 B2* | 8/2023 | Shaw | H04B 1/3877 455/575.1 |
| 2005/0122016 A1* | 6/2005 | Behroozi | A47B 23/04 312/351 |
| 2005/0205728 A1* | 9/2005 | Avery | F16M 13/04 248/316.1 |
| 2008/0029412 A1* | 2/2008 | Ho | F16M 11/2014 361/679.55 |

* cited by examiner

*Primary Examiner* — Steven M Marsh
(74) *Attorney, Agent, or Firm* — John D. Tran; Rhema Law Group

(57) ABSTRACT

An electronic device stand is provided, comprising: a bottom plate, a carrier plate, and at least one foldable assembly; the carrier plate is mounted on the bottom plate, and the surface of the carrier plate has a first position and a second position spaced apart; the foldable assembly is connected to the first position or the second position and is adjustable to change an included angle with the carrier plate at the connection, the foldable assembly is bendable to provide a support mode and a storage mode; in the storage mode, the foldable assembly is flatly attached to the carrier plate; in the support mode, the foldable assembly is bent into a bulge to stand on the carrier plate for supporting an electronic device placed on the foldable assembly.

20 Claims, 17 Drawing Sheets

ELECTRONIC DEVICE STAND

BACKGROUND

1. Field of the Invention

The disclosure relates generally to an electronic device stand, and more particularly, to a stand with various modes to support an electronic device to stand upright, with ease to store and use.

2. Prior Developments

Electronic device commonly used by people today, such as notebook computers, tablet computers, etc., are often used by people because of powerful functions and convenience.

The requirements for the use of electronic products are different for different users. For example, some users hope that when using a notebook computer, the keyboard position and the desktop can be inclined at a small angle, which is convenient to view the keyboard or more convenient to type. In addition, the required inclination angle is different depending on the height, body type or habits of each user.

The tablet computer is mostly used for watching videos. Some users hope to have a stand so that the tablet computer can stand upright or slightly inclined on the desktop, so as to avoid holding for extended period of time. In addition, considering that such electronic devices are easy to carry, the supporting stand must also meet the requirements of easy storage and small size to achieve the effect of complementing each other. For this reason, the inventor designed the disclosed electronic device stand.

SUMMARY

A primary objective of the disclosure is to provide a direction control apparatus. The direction control apparatus is featured by a magnetic sensing principle and is adapted for sensing a displacement direction and a displacement amount of a direction input mechanism, and therefore is configured with a relatively small size.

The main purpose of the disclosure is to provide an electronic device stand, which can be operated in a plurality of different modes, so that a notebook computer or a tablet computer can stand vertically on the desktop with the assistance of the stand, or can be in a plurality of different inclined states stably when the stand is installed on the desktop to provide users with a convenient way of use.

In order to achieve the aforementioned purpose, the disclosure provides an electronic device stand, comprising: a bottom plate, a carrier plate, and at least one foldable assembly; the carrier plate is mounted on the bottom plate, and the surface of the carrier plate has a first position and a second position spaced apart; the foldable assembly is connected to the first position or the second position and is adjustable to change an included angle with the carrier plate at the connection, the foldable assembly is bendable to provide a support mode and a storage mode; in the storage mode, the foldable assembly is flatly attached to the carrier plate; in the support mode, the foldable assembly is bent into a bulge to stand on the carrier plate for supporting an electronic device placed on the foldable assembly.

In a preferred embodiment, the bottom plate has an elongated guide groove, and the carrier plate is mounted on the bottom plate through the guide groove by a limiting member, so that the carrier plate can move along the guide groove or rotate.

In a preferred embodiment, the bottom plate further includes a stopper, the stopper is located at the edge of the bottom plate, and the position of the stopper is higher than the surface of the bottom plate connected to the carrier plate.

In a preferred embodiment, the carrier plate is in a shape of a long stripe, the first position and the second position are adjacent to both sides of the long side of the carrier, and there are two foldable assemblies, respectively connected to the first position and the second position.

In a preferred embodiment, the foldable assembly includes a connecting piece, an intermediate piece and a magnetic suction piece, connected in sequence, each piece is bendable at the connection, and the foldable assembly is connected to the first position or the second position by the connecting piece.

In a preferred embodiment, the carrier plate is disposed with a plurality of magnetic attachment areas between the first position and the second position; when magnetically attached to the corresponding magnetic attachment area, the magnetic suction piece maintains the connecting piece and the intermediate piece to stand on the carrier plate forming an angle.

In a preferred embodiment, the connecting piece has a first window, the intermediate piece has a second window, the first window communicates with the second window and forms an opening, when the connecting piece standing on the carrier plate at an included angle with the intermediate piece, an edge of the electronic device is located in the first window and the second window, and is erected upright on the carrier plate.

In a preferred embodiment, the foldable assembly also includes at least one soft piece, and the soft piece is disposed on the same-side inner wall of the first window and the second window, and the soft piece does not block the opening of the first window and the second window, the size of the opening is smallest at the connection where the connecting piece joins the intermediate piece.

In a preferred embodiment, the foldable assembly includes a connecting piece, an intermediate piece and a latching piece connected in sequence, the connecting piece and the intermediate piece are bendable at the connection, but the latching piece is fixed on the side of the intermediate piece.

In a preferred embodiment, the carrier plate is provided with a buckle seat in a middle position, the buckle seat has a curved piece protruding upward, and the latching piece has a strip of button holes in a middle position; in the storage mode, the connecting piece and the intermediate piece are flatly attached to the carrier plate, and the curved piece of the buckle seat is inserted into the button hole of the latching piece.

In a preferred embodiment, the latching piece has a curved hook piece at the end away from the connection with the intermediate piece, and the carrier plate has a plurality of positioning holes between the first position and the second position, the positioning holes penetrate the carrier plate and are shaped narrow at the top and wide at the bottom; in the support mode, the latching piece is inserted into the corresponding positioning hole, and the hook piece is hooked on the wide part of the positioning hole to keep the connecting piece and the intermediate piece standing on the carrier plate at an included angle.

In a preferred embodiment, the junction of the connecting piece and the intermediate piece are connected at the junction, and the inner walls of the first window and the second window are all provided with a soft colloid body, and the soft colloid body allows the junction of the connecting piece and the intermediate piece to bend arbitrarily at any angle without separation.

In a preferred embodiment, the soft colloid body further includes a plurality of soft convex pieces symmetrically distributed on the inner wall of the first window and the second window without blocking the opening, and a gap is provided between two adjacent soft convex pieces.

Compared with the prior developments, the present disclosure sets forth the foldable design of the foldable assembly, the connecting piece and the intermediate piece form various angles to stand on the carrier plate, in combination with the carrier plate adjusted on the bottom plate to an appropriate angle and position, the electronic device can be placed on the foldable assembly at different inclination angles or in an upright standing position, so that the user can use the electronic device more conveniently. The electronic device stand provides excellent convenience, and furthermore, the bottom plate, the carrier plate, and the foldable assembly are small and flat in the storage mode, which is convenient to carry and use with portable electronic devices.

BRIEF DESCRIPTION OF THE DRAWINGS

The electronic device stand will be apparent to those skilled in the art by reading the following detailed description of a preferred embodiment thereof, with reference to the attached drawings, in which.

DETAILED DESCRIPTION

The accompanying drawings are included to provide a further understanding of the invention, and are incorporated in and constitute a part of this specification. The drawings illustrate embodiments of the invention and, together with the description, serve to explain the principles of the invention.

The technical solutions of the present invention will be described clearly and completely below in conjunction with the specific embodiments and the accompanying drawings. It should be noted that when an element is referred to as being "mounted or fixed to" another element, it means that it can be directly on the other element or an intervening element may also be present.

When an element is referred to as being "connected" to another element, it means that it can be directly connected to the other element or intervening elements may also be present. In the illustrated embodiment, the directions indicated up, down, left, right, front and back, etc. are relative, and are used to explain that the structures and movements of the various components in this case are relative.

These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
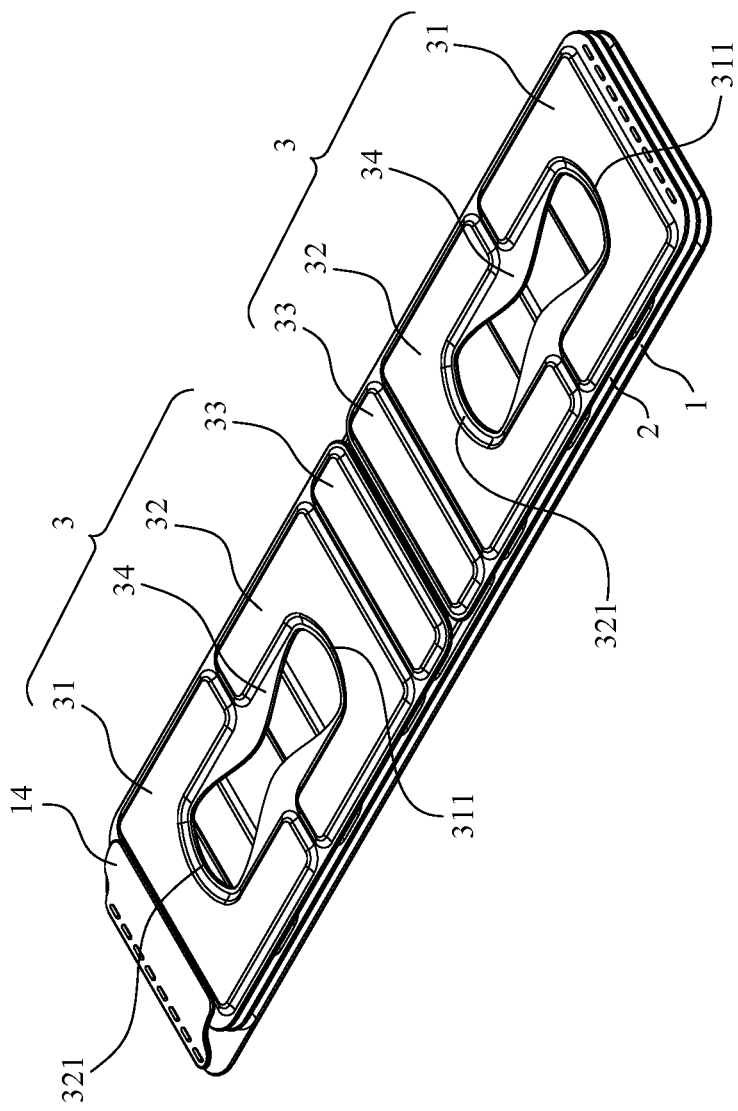
FIG. 1 is a schematic view of the storage mode of the first embodiment of the electronic device stand of the present invention.
Figure 2:
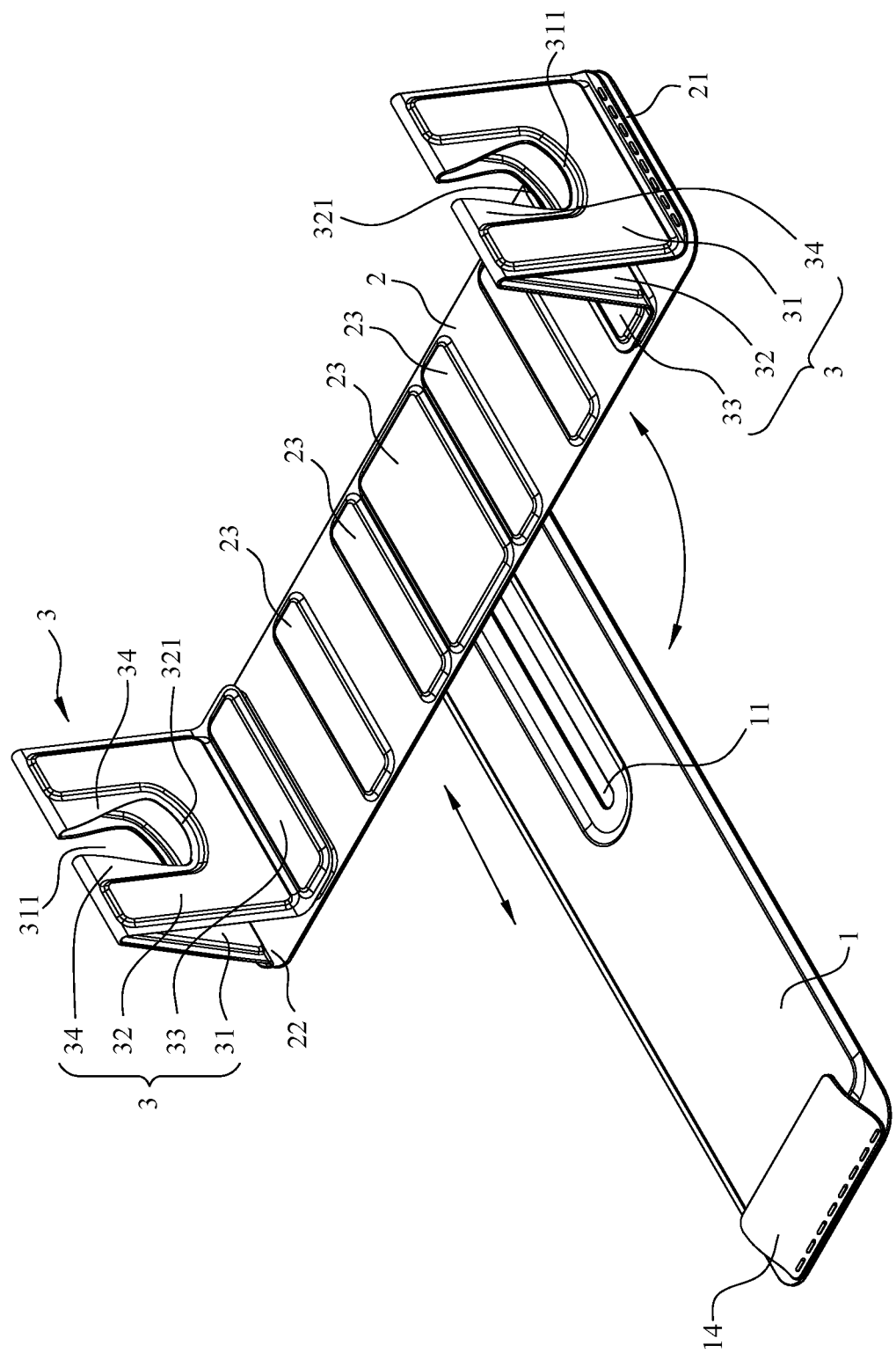
FIG. 2 is a schematic view of the support mode of the first embodiment of the electronic device stand of the present invention.

As shown in FIG. 1 and FIG. 2, the electronic device stand can include a bottom plate 1, a carrier plate 2, and at least one foldable assembly 3, and the carrier plate 2 is mounted on the bottom plate 1 and is adjustable to change an included angle or position with respect to the bottom plate 1. The surface of the carrier plate 2 defines a first position 21 and a second position 22 separated by a distance, and at least one of the foldable assemblies 3 is connected to the first position 21 or the second position 22 of the carrier plate 2.

In addition, the angle between the foldable assembly 3 and the carrier plate 2 can be adjusted at the connection, and in the present embodiment, the connection is foldable. When bent, the foldable assembly provides a support mode and a storage mode.

As shown in FIG. 1, in the storage mode, the foldable assembly 3 is flatly attached to the carrier plate 2, so that the small volume is easy to store or carry. As shown in FIG. 2, in the support mode, the foldable assembly 3 is bent into a bulge to stand on the carrier plate 2 for an electronic device to be placed thereto. The placement can be upright or at a variety of inclination angles, and the electronic device can be a notebook computer or a tablet computer.

Figure 3:
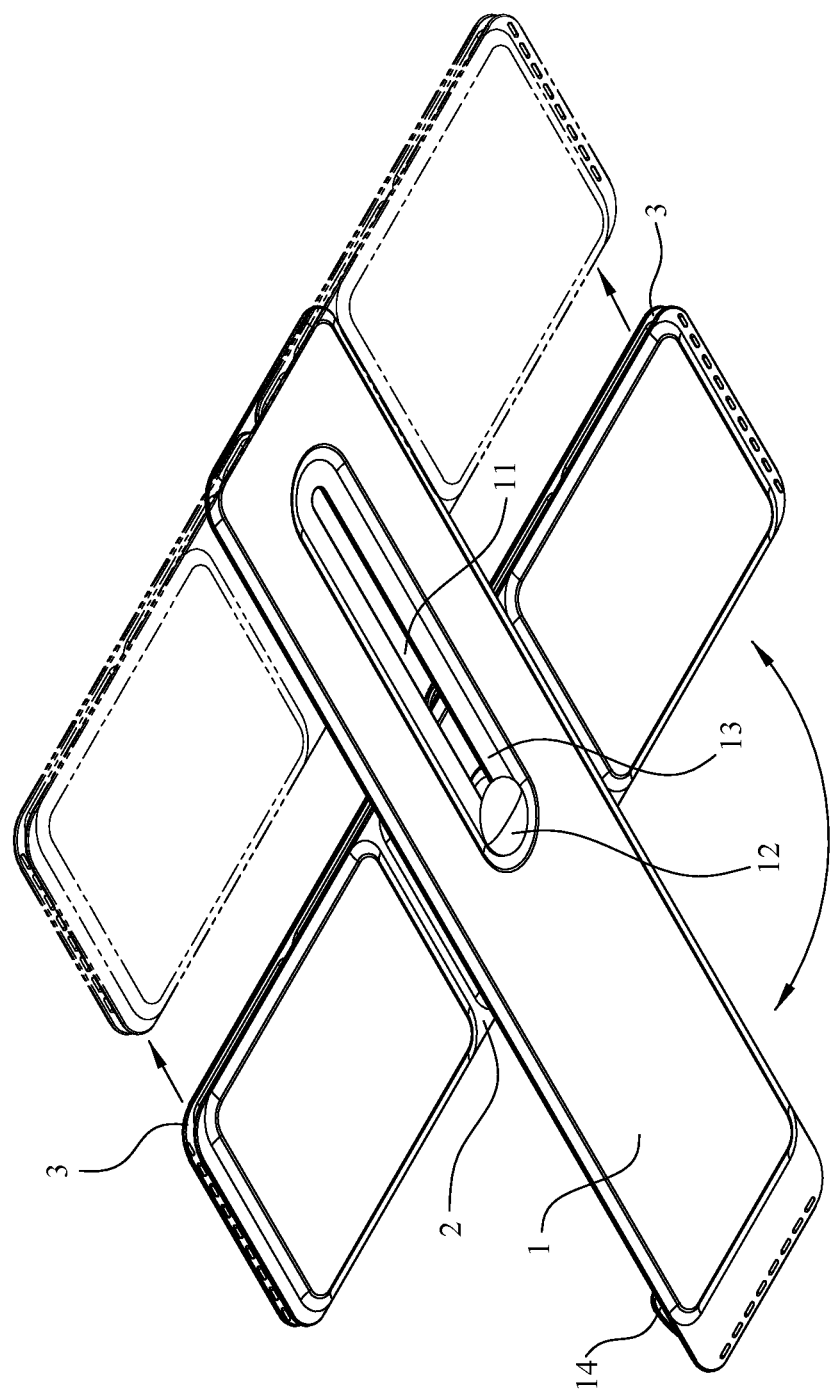
FIG. 3 is a bottom view of the first embodiment of the electronic device stand of the present invention.

The following provides a detailed description of each component:

The bottom plate 1 is an elongated plate body on which the carrier plate 2 is mounted, and the two can be adjusted in angle or position. In the present embodiment, the angle and position can be adjusted as follows: the bottom plate 1 has a guide groove 11 in a stripe shape running through the bottom plate 1, as shown in FIG. 3, and a limiting member 12 is provided to partially locked to the carrier plate 2 through the guide groove 11 from underneath, and the limiting member 12 can move in the guide groove 11 without separation from the guide groove 11.

In the present embodiment, the limiting member 12 may be rivets, screws or other fixing elements, so that the carrier plate 2 can be mounted on the bottom plate 1 and stays rotatable and movable. Moreover, in accordance with the exposed thickness of the limiting member 12, a concave area 13 is formed around the guide groove 11. The concave area 13 has a thickness whose longitudinal wall thickness is smaller than the thickness of the bottom plate 1.

When the bottom plate 1 is laid flat, the limiting member 12 is hidden in the concave area 13 instead of being raised. The bottom plate 1 further includes a stopper 14, and the stopper 14 is disposed on the edge of the bottom plate 1 and is higher than the surface of the bottom plate 1 connected to the carrier plate 2.

Figure 4:
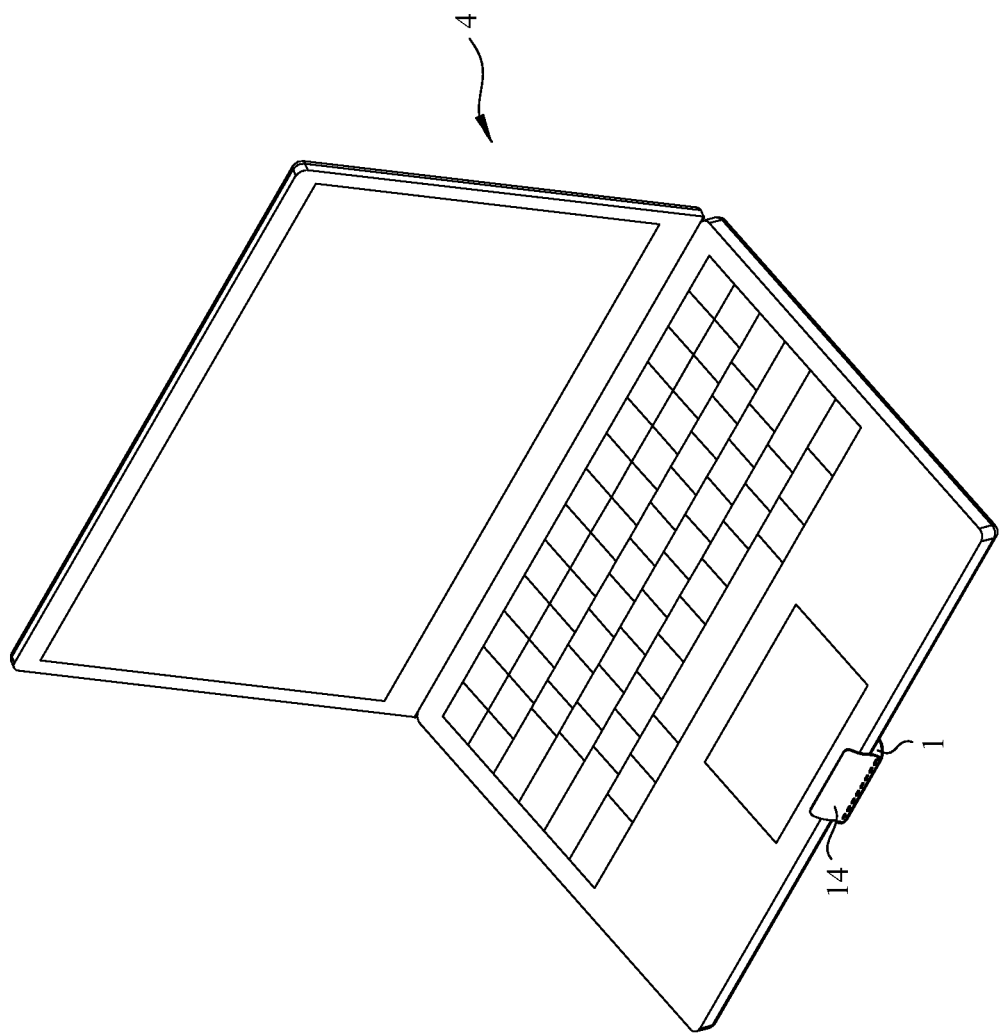
FIG. 4 is a schematic view of the first embodiment of the electronic device stand of the present invention in usage with notebook computer.
Figure 5A:
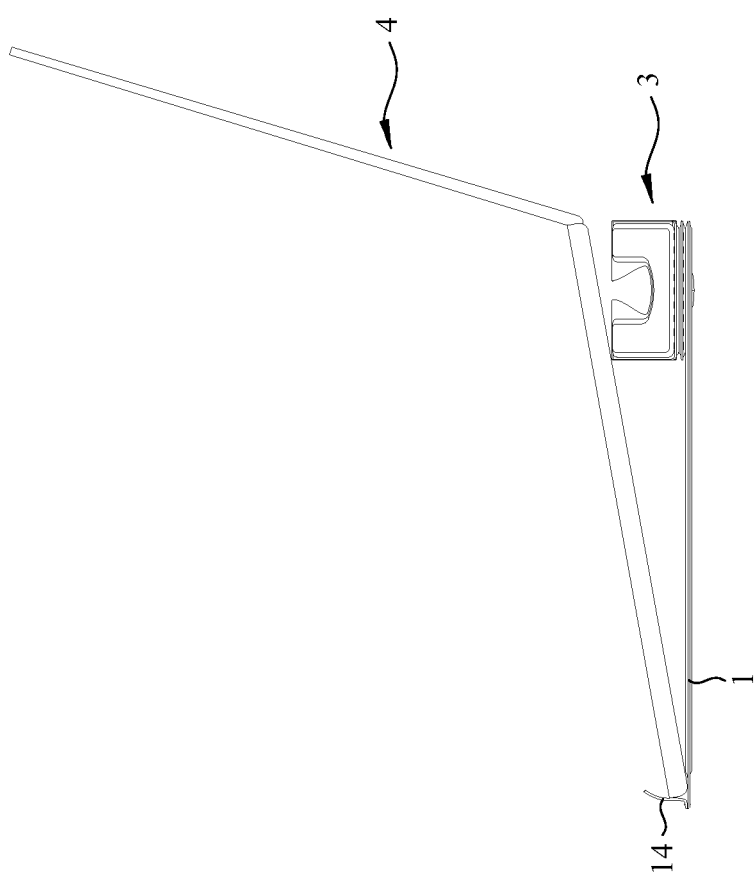
FIG. 5a is a side view of the usage in FIG. 4.
Figure 5B:
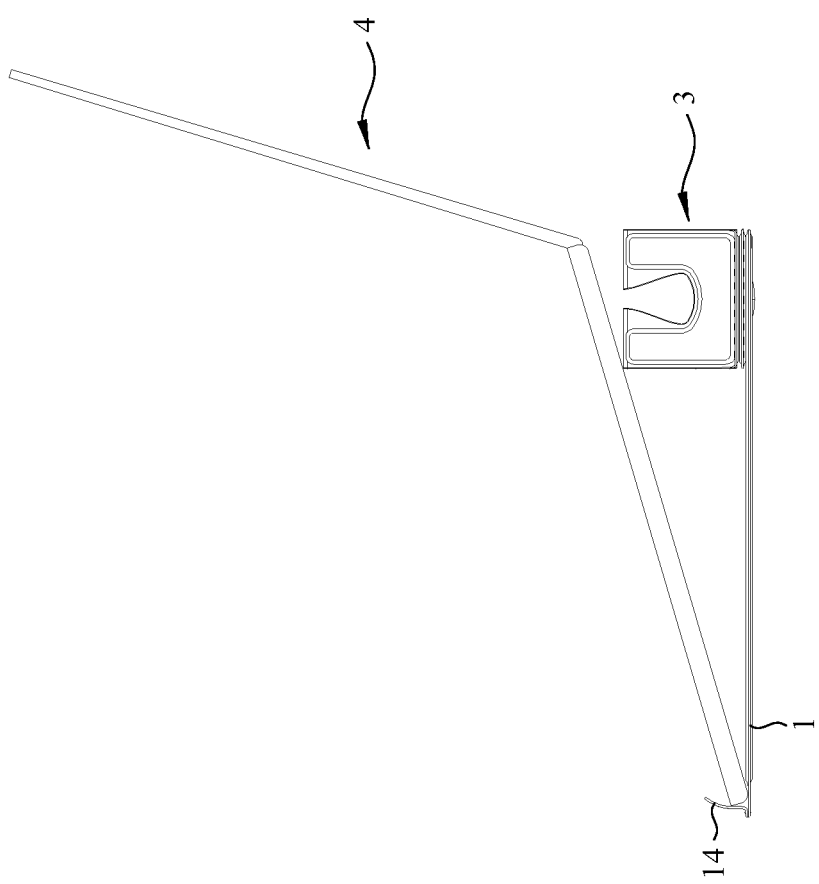
FIG. 5b is a side view of another usage in FIG. 4.

In the present embodiment, the stopper 14 is a piece-like protrusion, located at the edge of the bottom plate 1 and away from the guide groove 11. As shown in FIG. 4, FIG. 5*a*, and FIG. 5*b*, the stopper 14 is in contact with the bottom edge when the electronic device when in an inclined state to prevent the electronic device from sliding during use. In the figure, the electronic device is a notebook computer 4, and the edge of the keyboard is in contact with the stopper 14.

The carrier plate 2 is an elongated plate body with a shape similar to that of the bottom plate 1. When the two are aligned and stacked, the volume can be reduced, as shown in FIG. 1.

The bottom plate 1 and the carrier plate 2 can be metal or plastic, and then the outer parts of the components are covered with soft rubber, leather or nylon fabrics, etc., so as to have a better texture. The carrier plate 2 is used to carry the foldable assembly 3 and can maintain the foldable assembly 3 in the support mode and the storage mode.

There are many possible structures of the foldable assembly 3, and the present disclosure only provides two embodiments for illustration. In the first embodiment, the first position 21 and the second position 22 are adjacent to both ends of the long side of the carrier plate 2, and there are two foldable assemblies 3, which are respectively connected to the first position 21 and the second position 22, and can be bent at the joint.

When operating in the storage mode, the two foldable assemblies 3 are attached to the carrier plate 2 and are located between the first position 21 and the second position 22. In the present embodiment, a plurality of magnetic attachment areas 23 are distributed between the first position 21 and the second position 22 of the carrier plate 2, and ferromagnetic materials or metals are embedded in the magnetic attachment regions 23 for the purpose of providing the foldable assemblies 3 to adsorb and fix positions.

The foldable assembly 3 includes a connecting piece 31, an intermediate piece 32, and a magnetic suction piece 33 connected in sequence, and the connecting piece 31, the intermediate piece 32, and the magnetic suction piece 33 are all made of materials with good hardness, such as metal or plastic, and soft rubber, leather or nylon fabrics are used to cover the periphery of these pieces, so that these pieces can be arbitrarily bent at each connection without separation. The present embodiment includes two foldable assemblies 3, with each one connected to the first position 21 or the second position 22 by the connecting piece 31 and bendable arbitrarily at the connection.

A ferromagnetic material, such as a magnet, is embedded in the magnetic suction piece 33. But the present invention is not limited thereto. For example, when the magnetic suction piece 33 is embedded with one of metal and ferromagnetic material, the magnetic attachment area 23 is the other of metal and ferromagnetic material.

Figure 6:
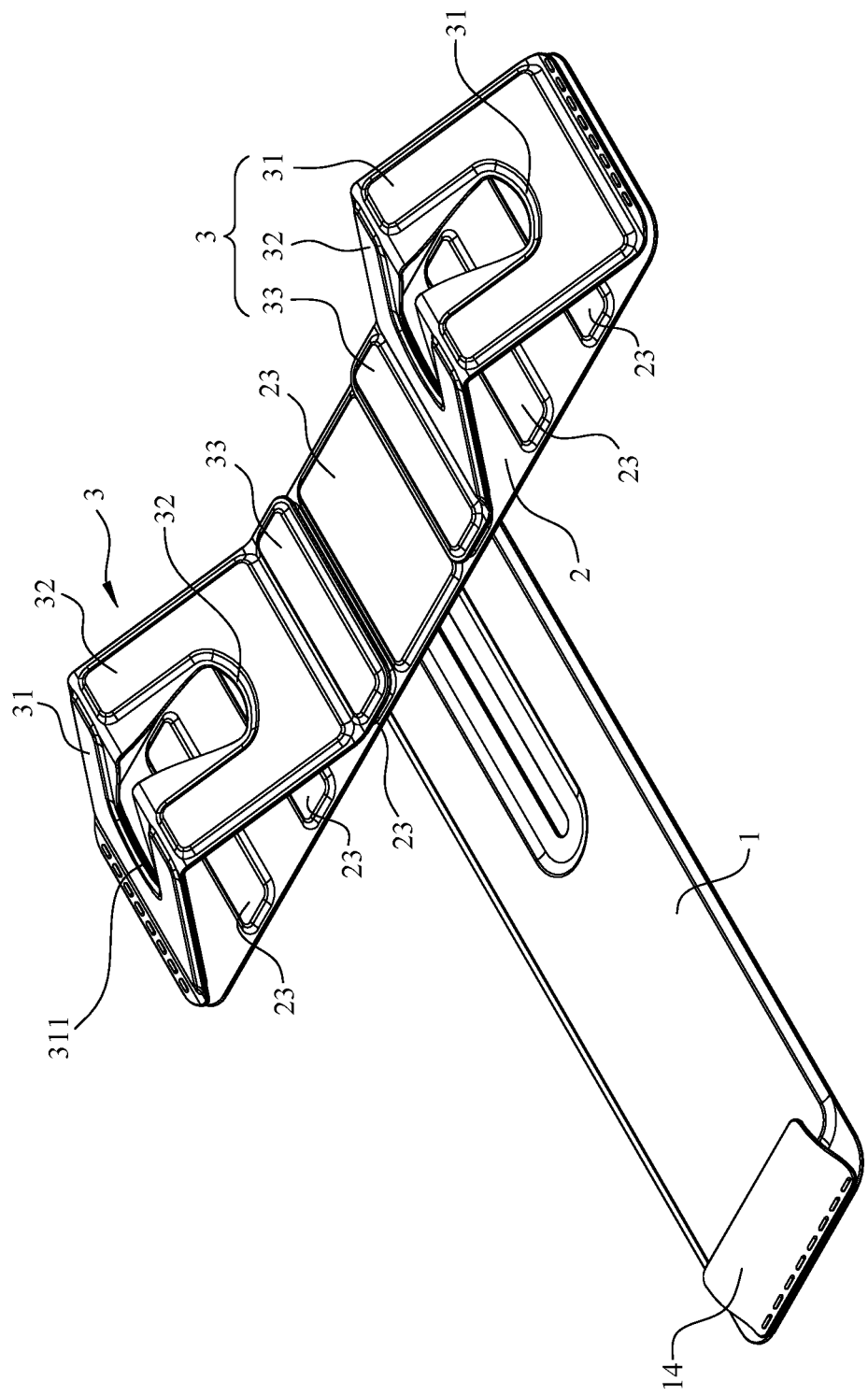
FIG. 6 is a schematic view of another support mode of the first embodiment of the electronic device stand of the present invention.

As shown in FIG. 2, when the magnetic suction piece 33 is magnetically attracted to the corresponding magnetic attachment area 23, the connecting piece 31 and the intermediate piece 32 can stand on the carrier plate 2 at an angle. As shown in FIG. 6, similarly, the angle between the connecting piece 31 and the intermediate piece 32 can be changed by using the magnetic suction piece 33 to magnetically attach to the magnetic attachment area 23 at different positions to provide different tilt angles for electronic devices, as shown in FIGS. 5*a* and 5*b*.

Figure 7:
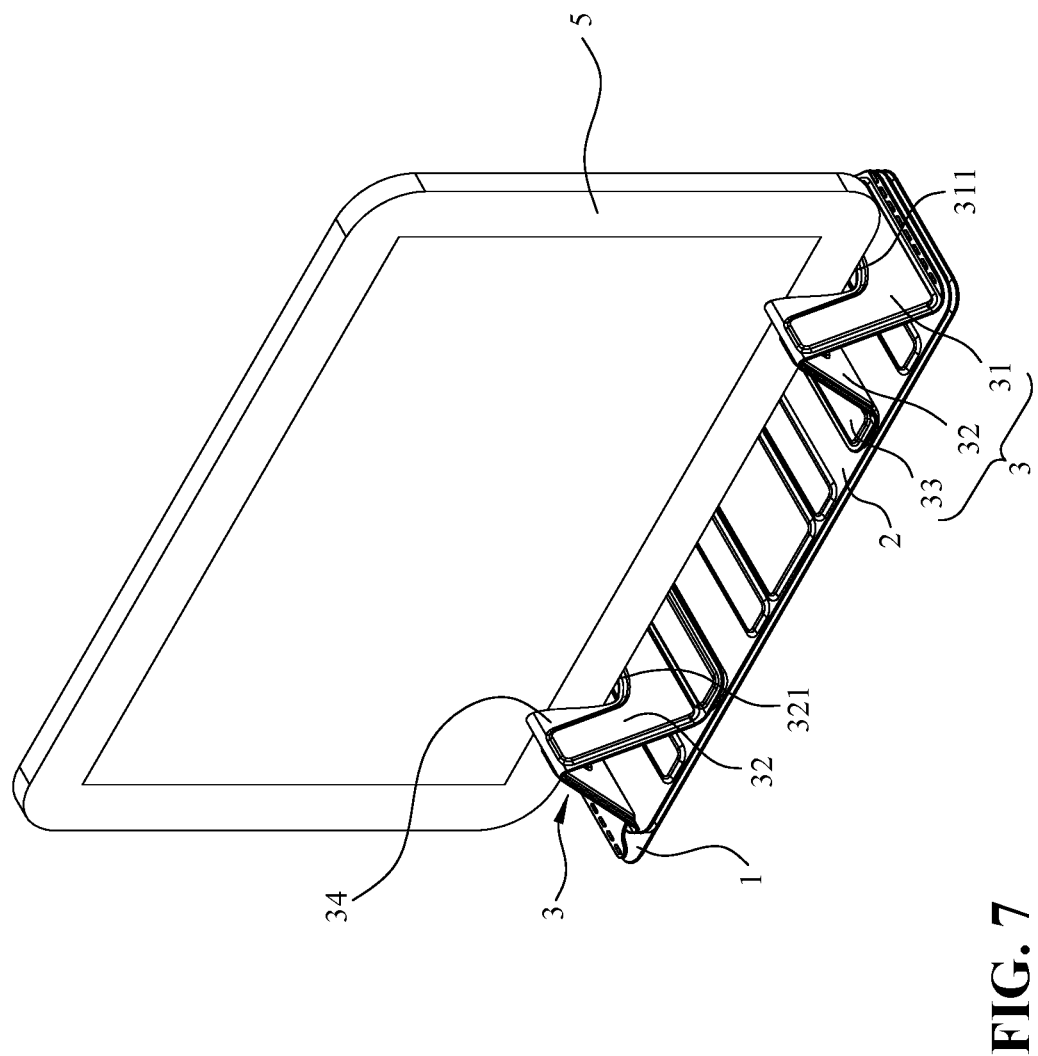
FIG. 7 is a schematic view of supporting a tablet computer according to the first embodiment of the electronic device stand of the present invention.
Figure 8:
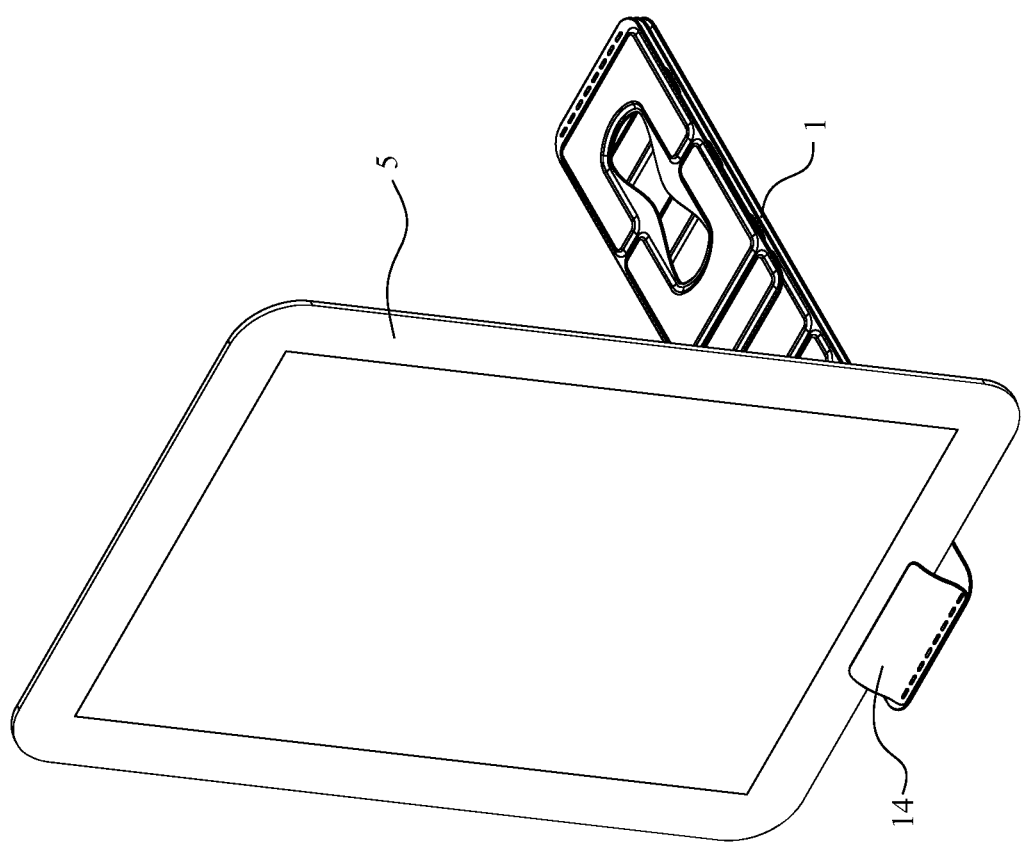
FIG. 8 is a schematic view of using a single foldable assembly to support in the first embodiment of the electronic device stand of the present invention.
Figure 9A:
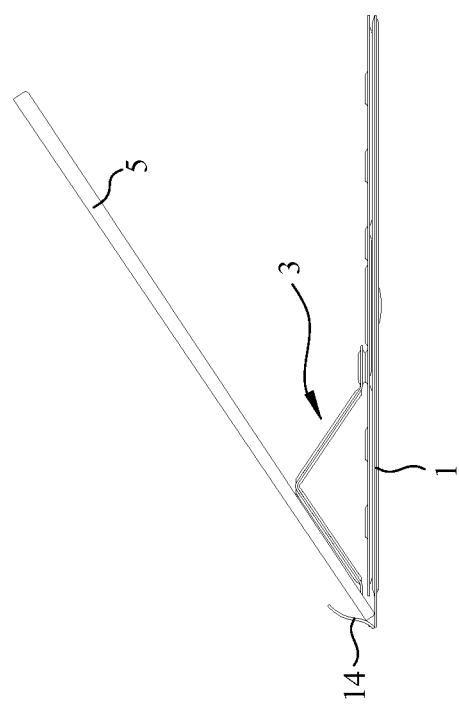
FIG. 9a is a side view of the usage in FIG. 8.
Figure 9B:
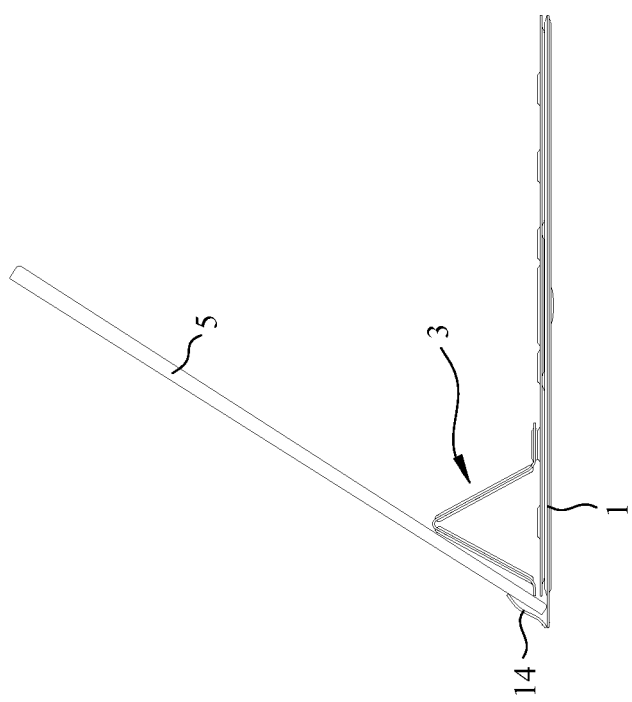
FIG. 9b is a side view of another usage in FIG. 8.
Figure 9C:
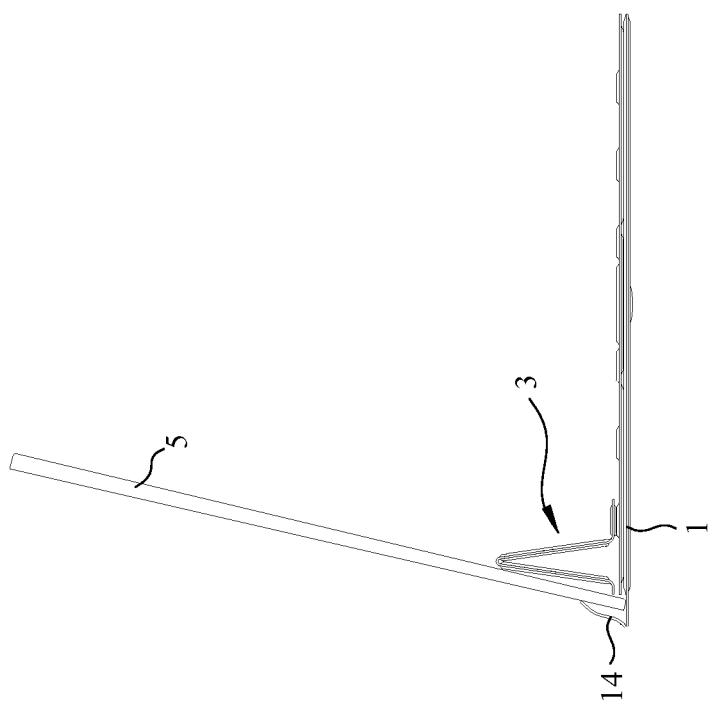
FIG. 9c is a side view of yet another usage in FIG. 8.

Furthermore, the foldable assembly 3 provides other special designs: the connecting piece 31 has a first window 311, the intermediate piece 32 has a second window 321, and the first window 311 and the second windows 321 communicate with each other and form a through opening. As shown in FIG. 7, when the connecting piece 31 and the intermediate piece 32 stand on the carrier plate 2 at an angle, the edge of a tablet computer 5 can be located on the first window 311 and the second window 321 to stand on the carrier plate 2 in an upright state.

Moreover, in order to accommodate other types or models of electronic devices with different thickness, the foldable assembly 3 also includes at least one soft piece 34, which is made of soft rubber material and is bendable. The soft piece 34 is disposed on the same-side inner wall of the first window 311 and the second window 321, the soft piece 34 does not block the opening formed by the first window 311 and the second window 321, the size of the opening is the smallest at the connection between the connecting piece 31 and the intermediate piece 32, so when the thickness of the electronic device is smaller than the opening size of the first window 311 and the second window 321, the soft piece 34 can be bent to contact with the electronic device, which can fill the gap to increase friction and firmness.

In the embodiment of FIG. 4, FIG. 5*a*, and FIG. 5*b*, the electronic device is a notebook computer 4, and the edge of the keyboard chassis can be used to approach the stopper 14, and the two foldable assemblies 3 are adjusted to the same support mode, the keyboard is maintained at an inclination angle by means of three-point contact; however, the present invention is not limited to be stopped by the stopper 14. In addition, the foldable assembly 3 can also be adjusted to change the angle between the connecting piece 31 and the intermediate piece 32, so as to provide the keyboard with different inclination angles, which is convenient for different users to operate the notebook computer.

Of course, the electronic device can also be a tablet computer 5 placed in the same manner as in FIG. 5*a* or FIG. 5*b*. As shown in FIG. 8, FIG. 9*a*, FIG. 9B, and FIG. 9*c*, the electronic device stand can use one foldable assembly 3 and the stopper 14 to maintain the tablet computer 5 at different inclination angles for easy viewing of videos played on a tablet computer.

In addition, in the embodiment of FIG. 7, the edge of the tablet computer 5 is located in the first window 311 and the second window 321, and stands on the carrier plate 2 in an upright state. Similarly, the electronic device can also be a notebook computer. As can be seen from the above embodiments, the notebook computer 4 or the tablet computer 5 can stand vertically on the desktop with the assistance of the electronic device stand, or can be stably placed on the desktop in various inclined states.

In the aforementioned embodiment, the foldable assembly 3 and the carrier plate 2 use the properties of magnets and metal to attract each other, so that the foldable assembly 3 is maintained in the support mode or the storage mode; however, the present invention is not limited thereto, the second embodiment of the present invention will be described as follows.

Figure 10:
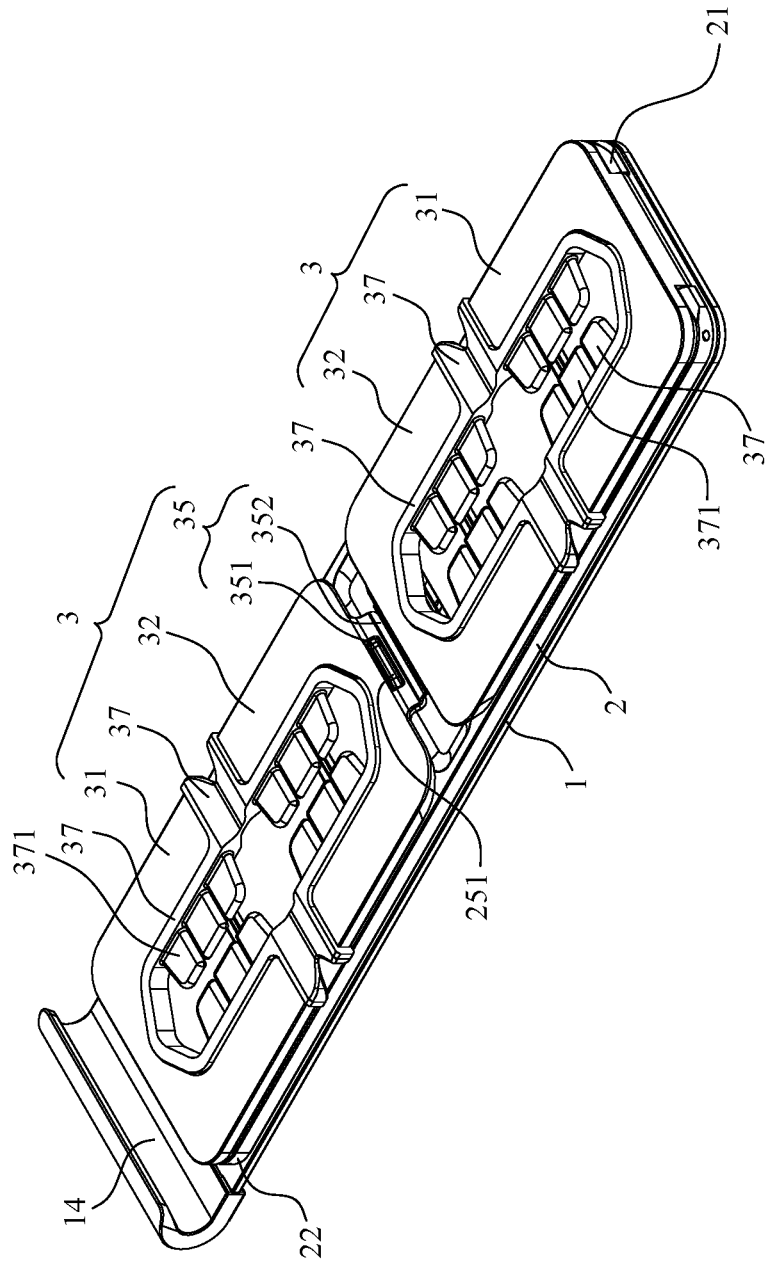
FIG. 10 is a schematic view of the storage mode of a second embodiment of the electronic device stand of the present invention.
Figure 11:
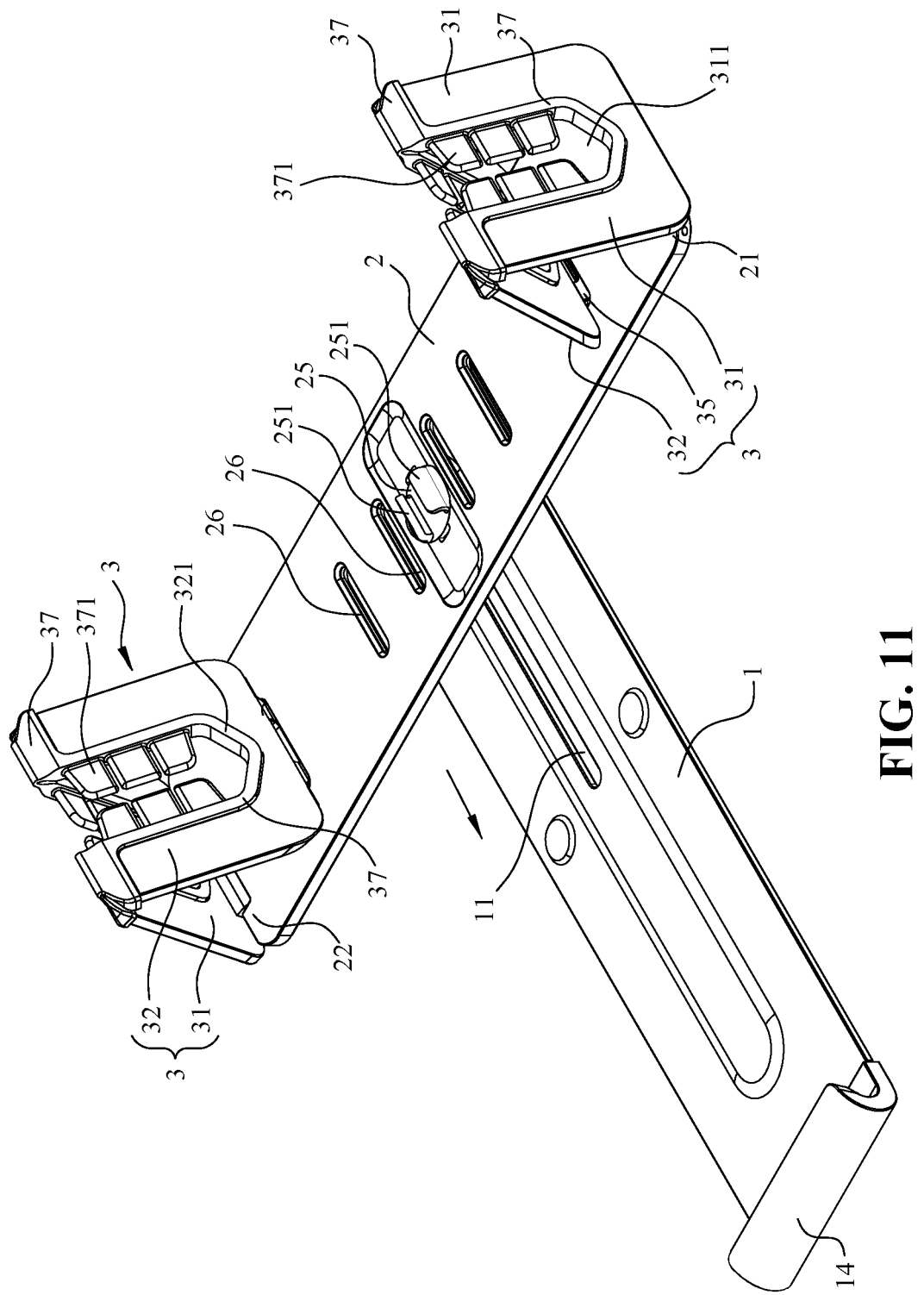
FIG. 11 is a schematic view of the support mode of the second embodiment of the electronic device stand of the present invention.
Figure 12:
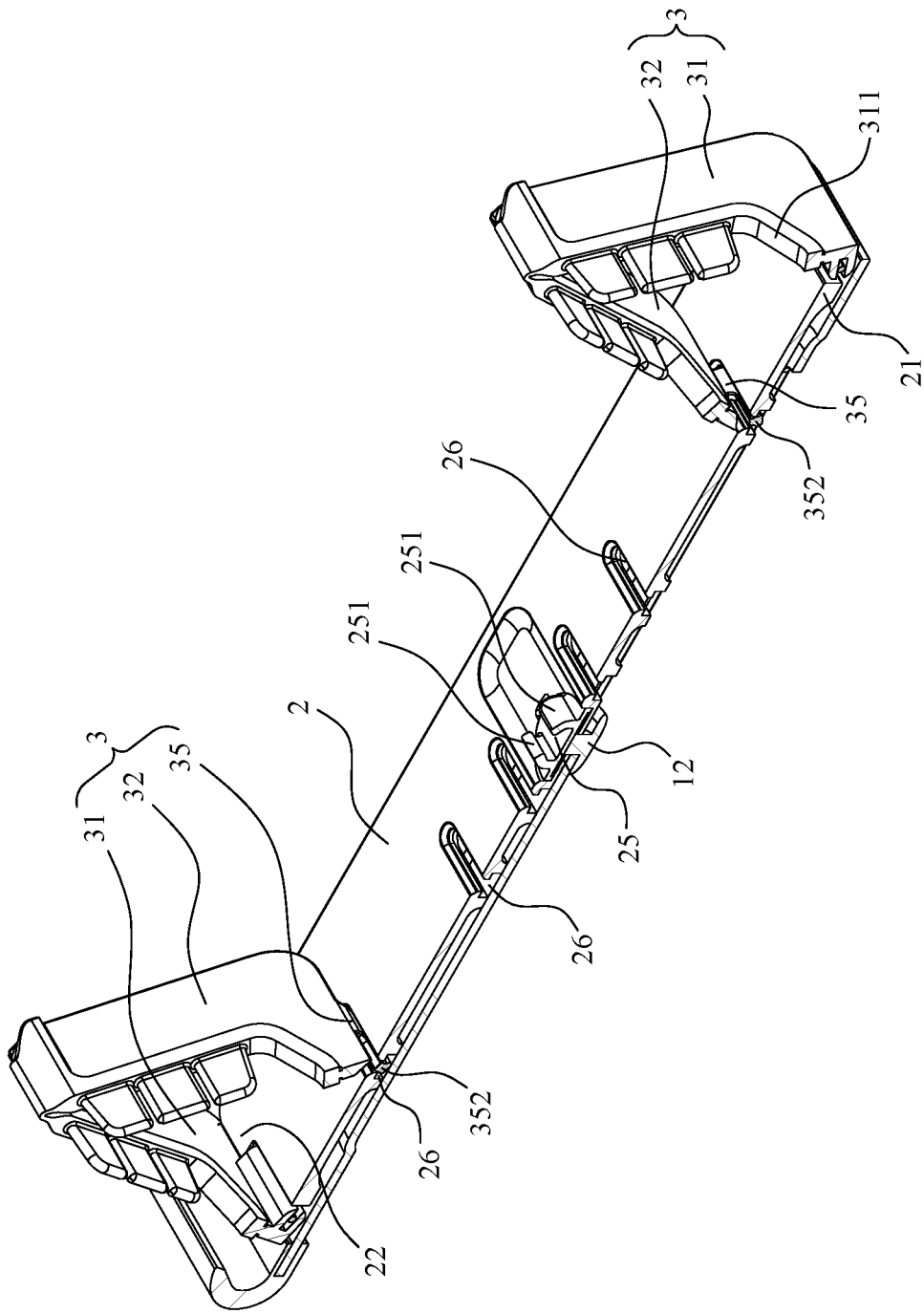
FIG. 12 is a schematic longitudinal cross-sectional view of the second embodiment of the electronic device stand of the present invention.
Figure 13:
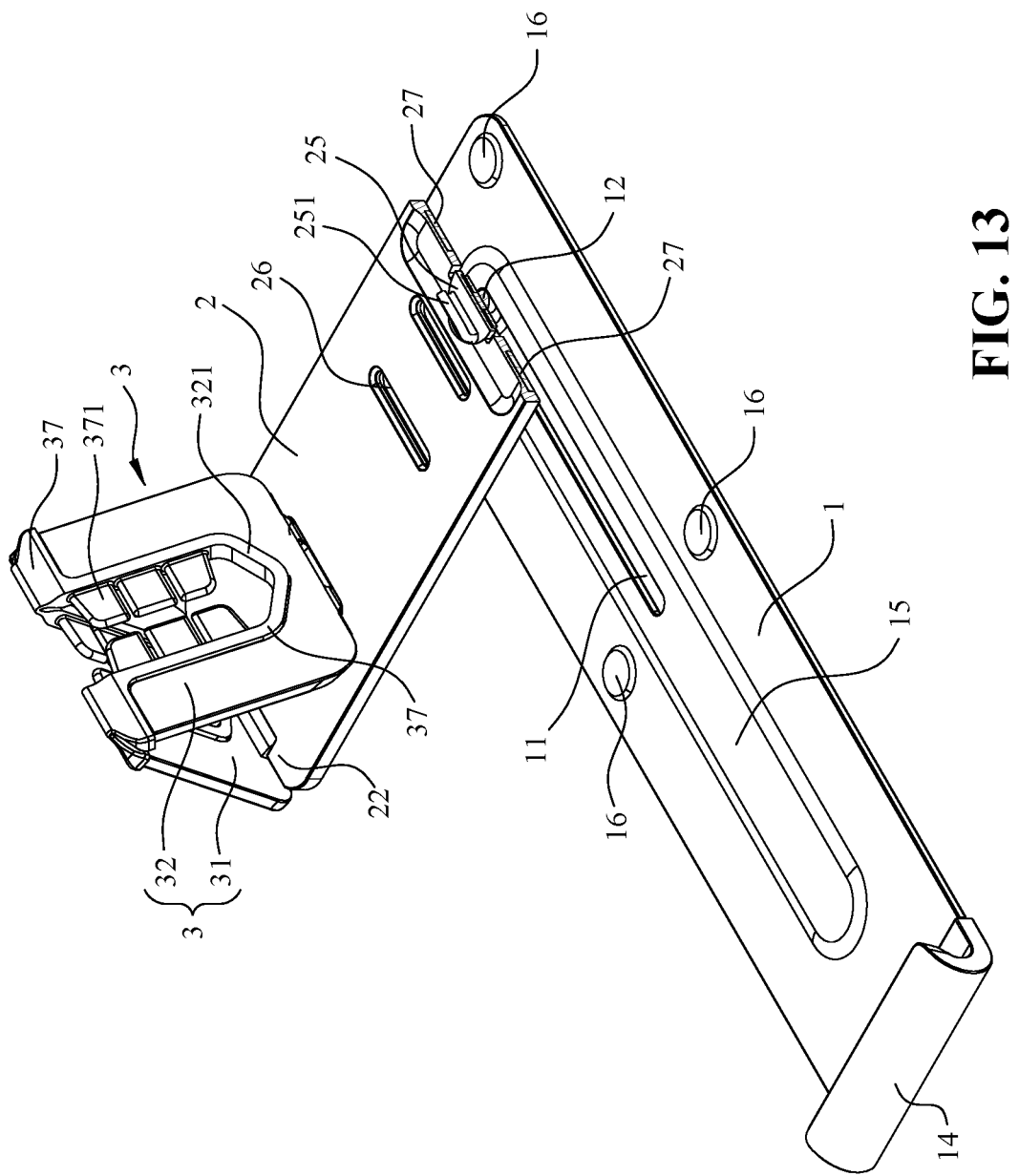
FIG. 13 is a schematic partial cross-sectional view of a carrier plate for the second embodiment of the electronic device stand of the present invention.

FIG. 10 is a schematic view of a storage mode according to the second embodiment of the present invention, and FIG. 11 is a schematic view of a support mode. The electronic device stand of the present embodiment still includes the bottom plate 1, the carrier plate 2, and at least one foldable assembly 3. As shown in FIG. 12 and FIG. 13, the bottom plate 1 still has the guide groove 11, and the carrier plate 2 is mounted on the bottom plate 1 partially through the guide groove 11 by the limiting member 12, so that the carrier plate 2 is rotatable and adjustable with respect to the bottom plate 1.

If the limiting member 12 has a tightness with the carrier plate 2, such as tight fit, the carrier plate 2 can be fixed after adjusting the position on the bottom plate 1, but the present embodiment provides other implementations. As shown in FIG. 13, the carrier plate 2 is embedded with a magnet 27 on the bottom surface, with a plurality of raised rounded portion 16 and a protruding stripe portion 15 in the middle portion.

The bottom surface where the protruding stripe portion 15 is located is a concave area 13. When the magnet 27 is attracted to the raised stripe portion 15, the carrier plate 2 and the bottom plate 1 are maintained in a vertical manner, and when the magnet 27 is attracted to the raised rounded portion 16, the carrier plate 2 and the bottom plate 1 are maintained in a stacked manner and align. In addition, in the present embodiment, the stopper 14 has a shape of a circular arc piece and is raised at the edge of the bottom plate 1, and a non-slip pad can be added to the surface of the stopper 14 so that the edge of the electronic device in contact with the stopper 14 in an inclined state will not slide.

The carrier plate 2 is still used for the two foldable assemblies 3 to be mounted thereon, and allows the foldable assemblies 3 to operate in the support mode and the storage mode on the carrier plate 2, but with different operation mode and structure from the previous embodiment.

Refer to FIG. 12. In the present embodiment, the foldable assembly 3 includes the connecting piece 31, the intermediate piece 32, and a latching piece 35 connected in sequence. The connecting piece 31 and the intermediate piece 32 can be bent at the connection, but the latching piece 35 is fixed on the side of the intermediate piece 32.

The latching piece 35 further includes a strip-shaped button hole 351 in the middle, and has a curved hook piece 352 at the end. The two foldable assemblies 3 are still connected to the first position 21 and the second position 22 by the connecting piece 31, but the connection manner is in a pivot structure, so that the connecting piece 31 can be arbitrarily adjusted to change the angle with respect to the carrier plate 2.

The carrier plate 2 is provided with a buckle seat 25 in the middle, and the buckle seat 25 has a curved piece 251 that protrudes upward. In addition, the carrier plate 2 is between the first position 21 and the buckle seat 25, a plurality of positioning holes 26 is disposed between the buckle seat 25 and the second position 22, and the positioning holes 26 penetrate the carrier plate 2 and are in the shape of a hole with a narrower top and a wider bottom.

As shown in FIG. 10, operate the foldable assembly 3 in the storage mode in the present embodiment, the connecting piece 31 and the intermediate piece 32 are flatly attached to the carrier plate 2, and the curved piece 251 of the buckle seat 25 is inserted into the button hole 351 of the latching piece 35, the two foldable assemblies 3 can be flatly attached to the carrier plate 2 without being separated. In addition, in this state, the carrier plate 2 and the bottom plate 1 are stacked and in alignment.

As shown in FIG. 11 and FIG. 12, when operating in the support mode, the latching piece 35 is inserted into the corresponding positioning hole 26, and the hook piece 352 is hooked in the wider bottom of the positioning hole 26 to maintain the connecting piece 31 and the intermediate piece 32 to stand on the carrier plate 2 at an angle.

Figure 14:
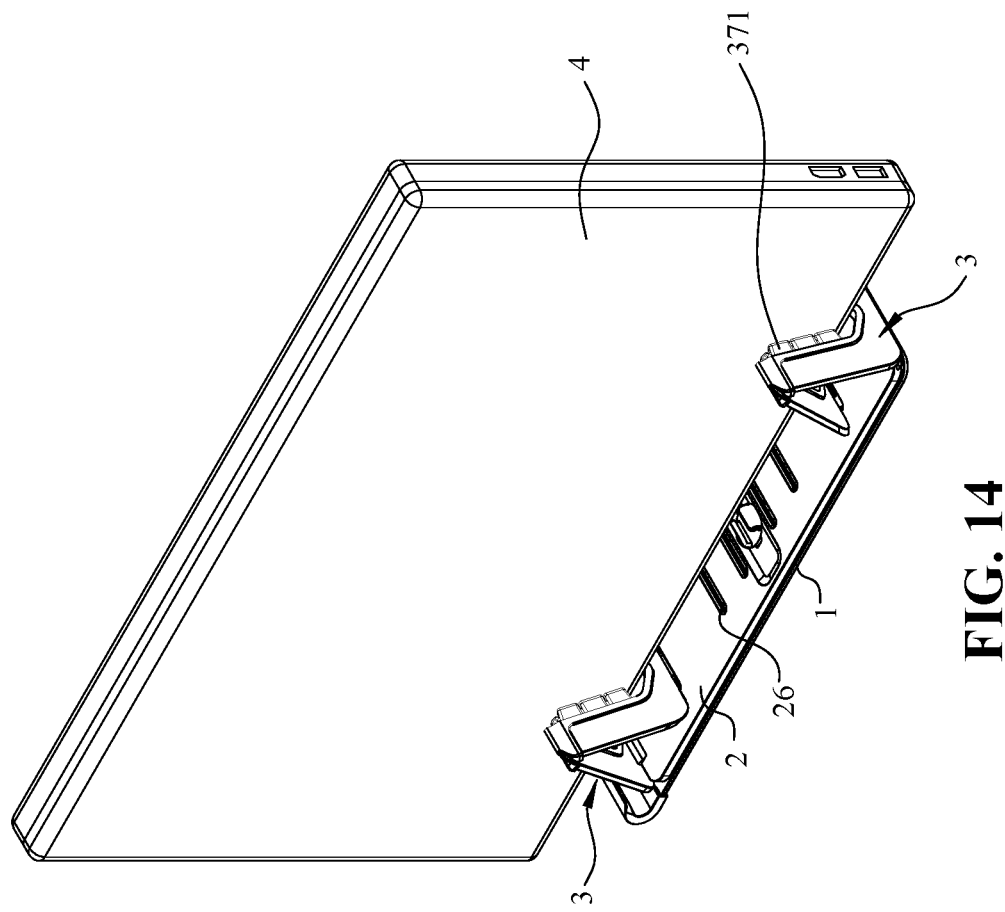
FIG. 14 is a schematic view of second embodiment of the electronic device stand of the present invention in use with an electronic device.

In addition, in the present embodiment, the connecting piece 31 still has a first window 311, the intermediate piece 32 has a second window 321, and the first window 311 communicates with the second window 321 to form a through opening. When the connecting piece 31 and the intermediate piece 32 stand on the carrier plate 2 at an angle, as shown in FIG. 14, the edge of the notebook computer 4 can be located in the first window 311 and the second window 321, which stands upright on the carrier plate 2.

The connecting piece 31 and the intermediate piece 32 can also be connected by a pivot structure, but the present embodiment uses a different approach. The connecting piece 31 is connected to the intermediate piece 32, and the inner walls of the first window 311 and the second window 321 are both provided with a soft colloid body 37, the soft colloid body 37 can be silicone or rubber, and is formed in the aforementioned position by injection molding. The junction can be bent and adjusted at any angle without separation.

The soft colloid body 37 has a plurality of soft convex pieces 371. The soft convex pieces 371 are symmetrically distributed on the inner walls of the first window 311 and the second window 321, and the adjacent soft convex pieces 371 are spaced.

The function of the soft convex piece 371 is the same as that of the aforementioned embodiment. That is, for the electronic device with thickness smaller than the size of the opening of the first window 311 and the second window 321, the soft convex piece 371 can be bent and contacted with the electronic device to fill the gap and increase holding firmness.

In the second embodiment, after the foldable assembly 3 is bent, the connecting piece 31 and the intermediate piece 32 can also form different angles to stand on the carrier plate 2, so that the electronic device can be used in a variety of different inclined states, which is the same as the first embodiment, and will not be repeated.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. An electronic device stand, comprising:
 a bottom plate;
 a carrier plate mounted on the bottom plate, the carrier plate having a carrier plate surface with a first position and a second position spaced apart; and
 a foldable assembly connectable to the first position or the second position, the foldable assembly adjustable to change an included angle with the carrier plate, and the foldable assembly bendable to provide a support mode and a storage mode, the foldable assembly is flatly attached to the carrier plate based on the foldable assembly being in the storage mode, and the foldable assembly bent into the included angle to stand on the carrier plate for supporting an electronic device placed on the foldable assembly based on the foldable assembly being in the support mode.

2. The electronic device stand according to claim 1, wherein the bottom plate has an elongated guide groove, and the carrier plate is mounted on the bottom plate through the elongated guide groove by a limiting member, the elongated guide groove and limiting member configured to allow the carrier plate to move along the elongated guide groove or rotate.

3. The electronic device stand according to claim 1, wherein the bottom plate further includes a stopper, the stopper is located at an edge of the bottom plate, and a position of the stopper is higher than a bottom plate surface of the bottom plate connected to the carrier plate.

4. The electronic device stand according to claim 1, further comprising a second foldable assembly with the foldable assembly connected to the first position and the second foldable assembly connected to the second position.

5. The electronic device stand according to claim 1, wherein the foldable assembly includes a connecting piece, an intermediate piece, and a magnetic suction piece, and the foldable assembly is connected to the first position or the second position by the connecting piece.

6. The electronic device stand according to claim 5, wherein the carrier plate includes a magnetic attachment area between the first position and the second position, and the magnetic suction piece maintains the connecting piece and the intermediate piece to stand on the carrier plate forming the included angle based on the magnetic suction piece being magnetically attached to the magnetic attachment area.

7. The electronic device stand according to claim 5, wherein the connecting piece has a first window, the intermediate piece has a second window, the first window and the second window forms an opening, and the electronic device is erected upright on the carrier plate based on an edge of the electronic device being located in the first window and the second window.

8. The electronic device stand according to claim 7, wherein the foldable assembly further includes a soft piece disposed on an inner wall of the first window and the second window, the soft piece does not block the opening of the first window and the second window, and a size of the opening is smallest at a connection where the connecting piece joins the intermediate piece.

9. The electronic device stand according to claim 1, wherein the foldable assembly includes a connecting piece, an intermediate piece, and a latching piece, the connecting piece and the intermediate piece are bendable at a connection, the latching piece is in a fixed position in relation to the intermediate piece.

10. The electronic device stand according to claim 9, wherein the carrier plate is provided with a buckle seat, the buckle seat has a curved piece protruding upward, and the latching piece has a button hole, the connecting piece and the intermediate piece flatly attached to the carrier plate and the curved piece of the buckle seat inserted into the button hole of the latching piece based on the foldable assembly being in the storage mode.

11. The electronic device stand according to claim 9, wherein the latching piece has a curved hook piece at an end opposite the intermediate piece, and the carrier plate has a positioning hole between the first position and the second position, the positioning hole penetrating the carrier plate and is shaped narrow at a top and wide at a bottom, the latching piece inserted into the corresponding positioning hole and the hook piece hooked on the bottom of the positioning hole to keep the connecting piece and the intermediate piece standing on the carrier plate at the included angle based on the foldable assembly being in the support mode.

12. The electronic device stand according to claim 9, wherein the connecting piece has a first window, the intermediate piece has a second window, the first window and the second window form an opening, the electronic device erected upright on the carrier plate based on the connecting piece standing on the carrier plate at the included angle with the intermediate piece and an edge of the electronic device being located in the first window and the second window.

13. The electronic device stand according to claim 12, wherein the connecting piece and the intermediate piece are connected at a junction, and inner walls of the first window and the second window are provided with a soft colloid body, and the soft colloid body allows the junction of the connecting piece and the intermediate piece to bend at any angle without separation.

14. The electronic device stand according to claim 13, wherein the soft colloid body further includes soft convex pieces symmetrically distributed on the inner walls of the first window and the second window without blocking the opening, and a gap is provided between two of the soft convex pieces.

15. An electronic device stand, comprising:
a bottom plate, including a stopper, the stopper being located at an edge of the bottom plate and protruding from a bottom plate surface of the bottom plate;
a carrier plate, mounted on the bottom plate, the carrier plate adjustable in angle and position, and the carrier plate having a carrier plate surface with a first position and a second position separated by a distance; and
a foldable assembly including a connecting piece and an intermediate piece, and the foldable assembly being connectable to the first position and the second position of the carrier plate by the connecting piece, an included angle between the foldable assembly and the carrier plate being adjustable, the connecting piece includes a first window, the intermediate piece includes a second window, the first window and the second window form an opening, the foldable assembly being bendable to provide a support mode and a storage mode, the connecting piece and the intermediate piece flatly attached to the carrier plate based on the foldable assembly being in the storage mode, and the connecting piece and the intermediate piece being bent to form a raised shape on the carrier plate based on the foldable assembly being in the support mode.

16. The electronic device stand as claimed in claim 15, wherein the foldable assembly further includes a magnetic suction piece connected to the intermediate piece at a connection, the connection being bendable, and the carrier plate disposed with a magnetic attachment area between the first position and the second position, and the connecting piece and the intermediate piece are maintained on the carrier plate at the included angle based on the magnetic suction piece being magnetically attached to the magnetic attachment area.

17. The electronic device stand as claimed in claim 15, wherein the foldable assembly further comprises a latching piece, the latching piece is fixed on a side of the intermediate piece, an end of the latching piece away from the intermediate piece has a curved hook piece, the carrier plate has a positioning hole between the first position and the second position, the positioning hole penetrates the carrier plate and is formed as a hole shape with a narrow upper part and a wider lower part, the latching piece inserted into the corresponding positioning hole and the hook piece hooked in the wider lower part of the positioning hole so that the connecting piece and the intermediate piece are maintained at the included angle to stand on the carrier plate, based on the foldable assembly being in the support mode.

18. An electronic device stand, comprising:
    a bottom plate;
    a carrier plate mounted on the bottom plate, the carrier plate adjustable to change an angle with respect to the bottom plate, and the carrier plate having a first position and a second position spaced apart; and
    a foldable assembly connectable to the first position or the second position, the foldable assembly adjustable to change an included angle with the carrier plate, and the foldable assembly bendable to provide a support mode and a storage mode, the foldable assembly being flatly attached to the carrier plate based on the foldable assembly being in the storage mode, and the foldable assembly bent into the included angle for supporting an electronic device based on the foldable assembly being in the support mode.

19. The electronic device stand of claim 18 wherein the base includes a guide groove, and the carrier plate is mounted to the guide groove with a limiting member, the limiting member moveable within the guide groove.

20. The electronic device stand of claim 18 wherein the base includes a stopper in the shape of a circular arc and the stopper raised at an edge of the bottom plate.

\* \* \* \* \*